United States Patent [19]

Hunt et al.

[11] Patent Number: 4,531,781
[45] Date of Patent: Jul. 30, 1985

[54] OFF-HIGHWAY DUMP TRUCK

[75] Inventors: Al E. Hunt; Richard A. Chandler, both of Cardin; Robert J. Ward, Castle, all of Okla.

[73] Assignee: Wiseda Ltd., Cardin, Okla.

[21] Appl. No.: 475,346

[22] Filed: Mar. 14, 1983

[51] Int. Cl.³ .............................................. B60P 1/16
[52] U.S. Cl. ................................ 298/22 P; 180/68.4; 188/343; 267/63 R; 267/141.1; 280/716; 280/790; 296/184
[58] Field of Search ................ 298/1 R, 1 H, 17 R, 298/22 R, 22 P; 280/716, 790, 797, 796; 180/68.1, 68.4; 188/77 R, 343; 267/63 R, 141.1, 153

[56] References Cited

U.S. PATENT DOCUMENTS

| | | | |
|---|---|---|---|
| 693,659 | 2/1902 | LaFrance | 188/77 R |
| 1,833,424 | 11/1931 | Jansson | 180/68.4 |
| 3,120,382 | 2/1964 | Paulsen | 267/63 R |
| 3,211,498 | 10/1965 | Peller | 298/22 P |
| 3,434,708 | 3/1969 | Hawk | 267/63 R |
| 3,552,798 | 1/1971 | Cole et al. | 298/22 R |
| 3,786,889 | 1/1974 | Kelley | 180/65.4 X |
| 4,190,265 | 2/1980 | Goodbary et al. | 280/716 |

Primary Examiner—Leslie J. Paperner
Attorney, Agent, or Firm—Head, Johnson & Stevenson

[57] ABSTRACT

A large two axle rear dump off-highway vehicle comprising a main frame section, a tilting dump body, a cab section, a radiator section, front wheels providing steering for the vehicle, and rear wheels providing a driving power for the vehicle. The main frame section includes a pair of spaced deep "V" box sections secured in spaced relation by spaced tubular cross members for added strength, the radiator section is vertically adjustable for facilitating adjusting of the belt tension in the radiator fan drive assembly, the rear wheels are secured to the opposite ends of a common axle which is secured to the main frame section by means of upper A-frames and cooperating drag links whereby the overall length of the main frame section may be maintained at a minimum, front and rear suspension assemblies are secured between the front and rear wheels and the vehicle for absorbing substantially all of shock of the wheels during movement of the vehicle over rough terrain, and independent hand brake assembly for added safety for the vehicle and operator.

13 Claims, 10 Drawing Figures

OFF-HIGHWAY DUMP TRUCK

BACKGROUND OF THE INVENTION

1. Field of the Invention

This invention relates to improvements in large off-highway vehicles and more particularly, but not by way of limitation, to a rear dump tilting body two axle type large off-highway vehicle.

2. Description of the Prior Art

Off-highway vehicles are in widespread use today for hauling extremely large and heavy loads in order to reduce time and expense in many industries, such as in the open mining industry, large construction industry, and the like. These hauling vehicles are usual dump-type vehicles, with some of the vehicles having a bottom dump feature, as shown in the Goodbary Pat. No. 4,106,813, issued Aug. 15, 1978 and entitled "Bottom Dump Door Linkage Apparatus and Dump Body Partition Means". Other off-highway dump vehicles are of the conventional tractor-trailer hauling unit such as shown in the Lackey et al U.S. Pat. No. 3,134,628, issued May 26, 1964 and entitled "Tilting Dumping Trailer." These rear dump tilting body units are usually powered only on the middle axle and if proper tire loading is maintained for a balanced design, there is usually not adequate loading on the drive axle for negotiating roadway grades. As a result, tractor-trailer units of this type are normally limited to use wherein road grades of not more than three percent or four percent, maximum, are present. In addition, tractor-trailer type off-highway hauling equipment usually has only three points of support and as a result may turn over somewhat readily. The relatively high center of gravity of these units also increases the instability thereof. Some activity has taken place in the development of self-contained tilting body rear dump vehicles, as opposed to the tractor-trailer type, such as that shown in the Kelley Pat. No. 3,786,889, issued Jan. 22, 1974, and entitled "Steerable Load Transporting Vehicle."

Under actual operating conditions these self-contained rear dump vehicles have certain disadvantages which particularly become apparent as the loading handling weight requirements have increased. For example, it is now desirable to provide vehicles of this type which will carry weights of 200 to 235 tons, and these operational conditions have produced working strains and problems in the use of the presently available vehicle equipment. For example, main frame design has been found to be lacking in sufficient strength for such working or operating conditions, the suspension mounting arrangements also are found to be insufficient and result in short useful life expectancy for the equipment. The safety and efficiency of the vehicle braking system also falls short of acceptable performance, particularly in the hand brake system on these large off-highway vehicles; the dump body design in and of itself frequently is not of a construction for receiving the required quantity of material under these large volume and weight hauling conditions; the cooling system for the radiator and fan assembly is frequently inadequate; as well as overall operator safety and comfort for the operator of the equipment is frequently less than desirable.

SUMMARY OF THE INVENTION

The present invention contemplates a novel off-highway two axle rear dump, tilting body vehicle which has been particularly designed and constructed for overcoming the foregoing disadvantages. The novel vehicle comprises a rigid frame including two deep section box beams connected by tubular cross members and plate stiffeners, the tubular cross members adding strength and leaving an open central portion for facilitating the installation of auxiliary equipment, and the like, for the vehicle. The rear suspensions are mounted over the top center line of the rear axle, and as a result the frame does not extend over the axle in the conventional manner thus reducing weight where it is not needed. In this manner a stronger frame is provided without increasing the overall weight thereof. The radiator is vertically adjustable by means of a drive belt tensioning means which is achieved by a cam arrangement designed in the trunnion mounting on the sides of the radiator. This design eliminates the conventional belt tensioning sheave and mount. In addition, the radiator is larger than normal, providing a greater operating efficiency at a lower rpm for an effective cooling system. The axle box attachment to the frame by means of an A-frame on top and two drag links is an important improvement in the construction and design of the novel off-highway rear dump vehicle, and the front A-frame and suspension control arms move vertically by threaded pins. An improved hand brake system is also provided for the vehicle for greater operator safety. A hydraulic cylinder is actuated by the "park position" and moves a wedge means into locking position in the brake means for holding the hand brake in an "on" mode. Fluid directed to the opposite end of the piston of the cylinder in the "park off" position moves the wedge out of the locking position and during normal driving conditions of the vehicle, fluid is maintained on the end of the piston means to keep the hand braking system in an "off" mode. An important feature of the hand brake system is that the system does not interfere with the brushes, and the like, of the electric wheel motors which are provided for the driving power of the vehicle, and as widely used in vehicles of this type. The novel off-highway rear dump two axle vehicle is of a more economical and durable construction and is more simple and efficient in operation than vehicles of this type which have heretofore been available.

DETAILED DESCRIPTION OF THE PREFERRED EMBODIMENT

Referring to the drawings in detail, reference character 10 generally indicates a rear dump two axle off-highway vehicle comprising a main frame section 12 supporting a pivotal dump body section 14, a cab section 16, and a front mounted engine section 18. A pair of front wheels 20 are mounted on the vehicle, and a pair of rear wheels 22 and 23 are suitably journalled on the opposite ends of a common axis 24. In this manner a two axle support is provided for the vehicle 10. The front wheels 20 are independently mounted on the opposite sides of the forward portion of the vehicle 10 in any suitable manner, and function in the normal operational mode for steering of the vehicle, as is well known. It is preferable to provide the usual cooperating brake caliper and disc-type brakes for the wheels 20 to provide a braking action for the vehicle 10. The two sets of rear wheels 22 and 23 are motorized, as is well known in vehicles of this type, and are secured to and driven by a suitable electric wheel motor such as the General Electric GE 787 motorized wheel drive, and are also preferably provided with the usual cooperating brake caliper and disc-type brakes, all as is well known in off-highway vehicles of this type.

Figure 1:
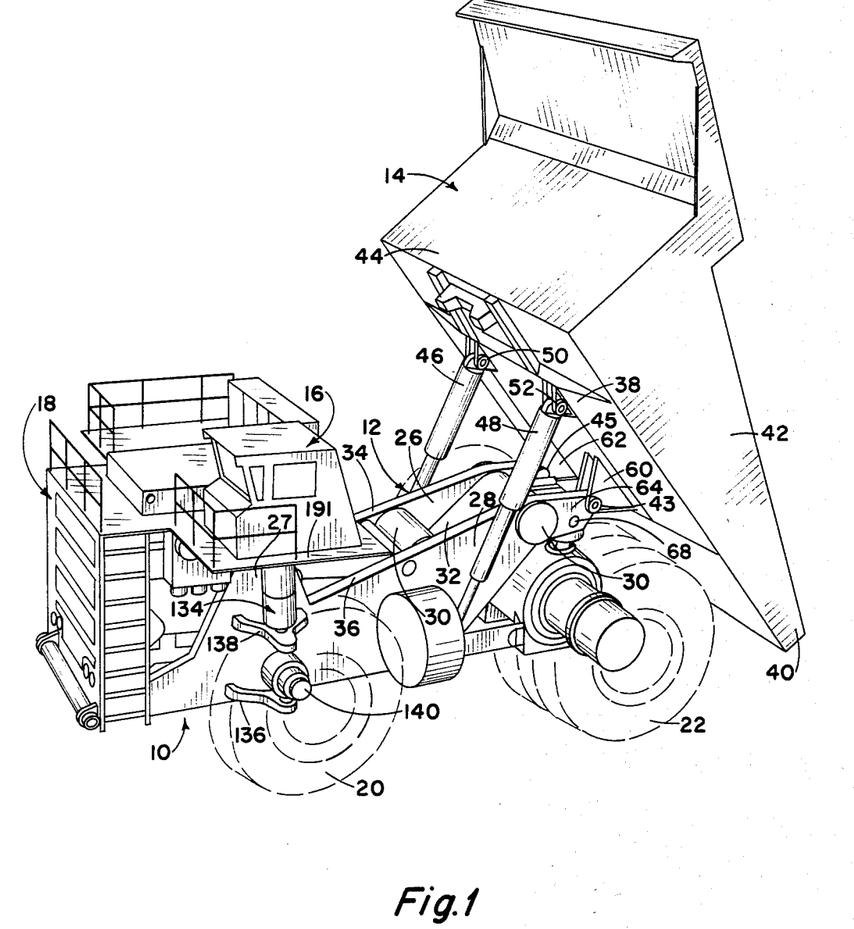
FIG. 1 is a perspective view of an off-highway two axle rear dump vehicle embodying the invention, and illustrated in a dumping position.

The main frame section 12 is essentially the backbone of the vehicle 10 and is of a rigid construction comprising a pair of spaced, substantially mutually parallel deep section box beams 26 and 28 (FIG. 1) connected together by a plurality of transversely extending longitudinally spaced tubular cross members 30 and stiffening plates 32. The cross members 30 provide strength for the frame section 12 and also leave the central portion of the frame section 12 open for facilitating the installation of equipment required for the overall vehicle assembly. In addition, it will be noted that the upper edges 34 and 36 of the box means 26 and 28 are substantially straight, and each box section 26 and 28 is provided with an A-frame 27 (only one of which is shown in FIG. 1) in the proximity of the forward end thereof for facilitating the support of the cab section 16 and wheels 20. The construction of the frame section 12 cooperates with the suspension system (to be hereinafter set forth in detail) for reducing breaking of the frame, which is a problem in other large off-highway vehicles of this type.

Figure 2:
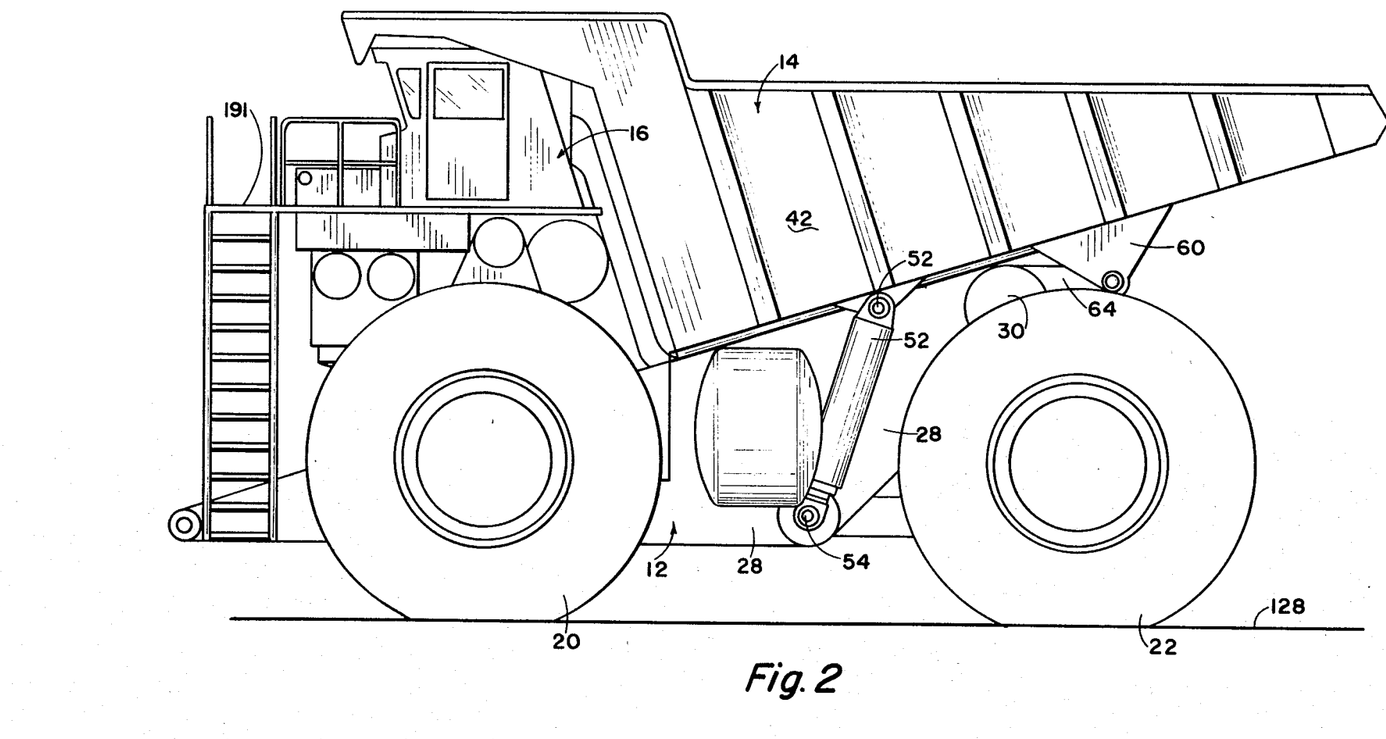
FIG. 2 is a side elevational view of an off-highway vehicle embodying the invention, and illustrated in the loading position.

The dump body section 14 is of a deep "V" design, as particularly shown in FIGS. 1 and 2, and is provided with a floor plate 38, a rear element 40, oppositely disposed side plates 41 and 42 and a front plate 44. The floor plate 38 is substantially flat, and is preferably of a double plate construction, with formed and welded angles providing a smooth surface both inside and out to minimize material build-up. In addition, the flat configuration of the floor plate 38 provides a straight line discharge of the load (not shown) from the interior of the dump body 14 during unloading of the vehicle 10. There is no kick-up lip at the rear plate 40, thus reducing the wear on the floor plate 38 and side plates 41 and 42 at the rear area of the dump body 14. In addition, the plane of the front plate 44 is preferably positioned at an angle of substantially 90° with respect to the plane of the floor plate 38 in order to minimize loading impact on the dump body 14 during loading of the vehicle 10.

The dump body 14 is pivotally secured to the main frame section 12 in any suitable manner for movement between a loading position as shown in FIG. 2 and a dumping position as shown in FIG. 1. As shown herein, the floor plate 38 is pivotally secured to the rear portion of the box sections 26 and 28 by a pair of spaced pivot connections 43 and 45 as will be hereinafter set forth in detail. A pair of suitable hydraulic cylinders 46 and 48 each have one end pivotally secured to the floor plate 38 by suitable pivot means 50 and 52, respectively, and the opposite ends similarly pivotally secured to the outer surface of the box sections 26 and 28, respectively, as shown at 54 and 56 in FIGS. 2 and 3. Of course, the hydraulic cylinders 46 and 48 may be operably connected with the hydraulic system of the vehicle 10 in the usual manner for selective actuation by the operator of the vehicle, as is well known, whereby extension of the cylinders pivots the dump body 14 in a clockwise direction about the pivot connections 43 and 45 as viewed in FIGS. 1 and 2 to a dumping position. A contraction of the cylinders 46 and 48 pivots the dump body 14 in a counterclockwise direction about the pivots 43 and 45 for restoring the body to the normal traveling and loading position therefor.

Figure 4:
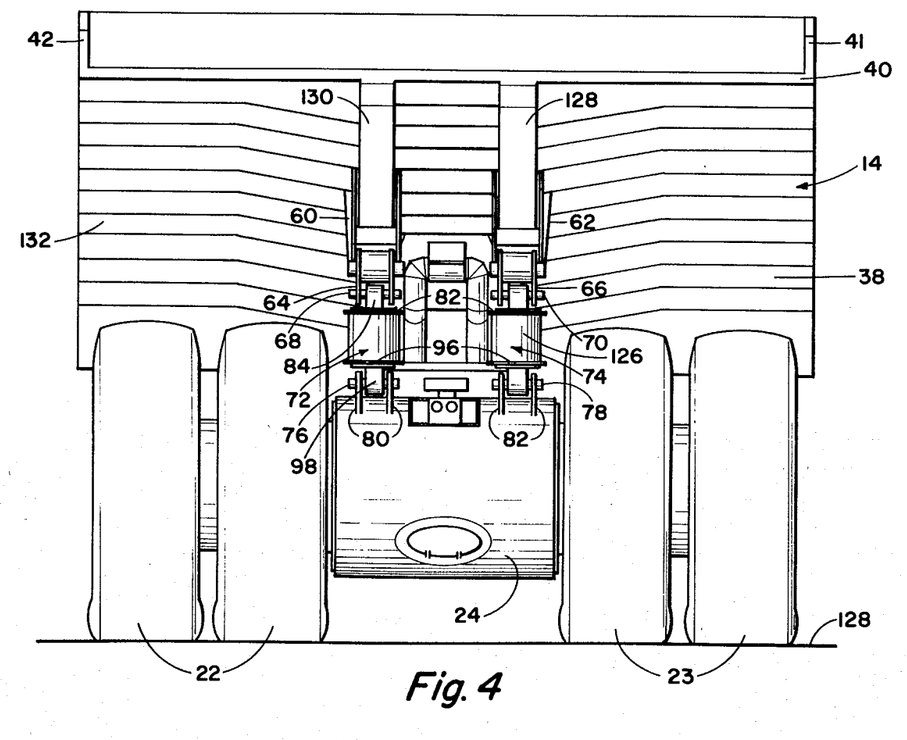
FIG. 4 is a rear elevational view of the vehicle shown in FIG. 2.

Referring now to FIGS. 1 and 4, the dump body 14 is secured to the main frame section 12 by means of an A-frame means 60 and 62 secured to the outer or under surface of the floor plate 38 and depending therefrom for pivotal connection at 43 and 45, respectively, with drag link means 64 and 66. The drag link means 64 and 66 are pivotally secured at one end to the trailing end of the box sections 28 and 26, respectively, at the rearmost tubular cross member 30 in any suitable well known manner. The opposite ends of the drag link means 64 and 66 are pivotally secured at 68 and 70 to the upper ends of rear suspension assemblies 72 and 74, respectively. The lower ends of the suspension members 72 and 74 are pivotally secured at 76 and 78 to upstanding pairs of spaced flanges 80 and 82 secured to the outer periphery of the axle box 24.

The rear suspension assemblies 72 and 74 are secured to the axle box 24 at the top centerline of the axle. This unique arrangement of the rear suspension assemblies in combination with the connection of the axle box with the frame 12 results in a shorter frame 12 whereby the frame 12 does not extend over the axle in the manner conventionally found in vehicles of this type. As a result, the weight of the frame 12 is reduced where it is not needed, and the structure of the frame 12 may be of a stronger construction without any increase in the overall weight thereof.

Figure 7:
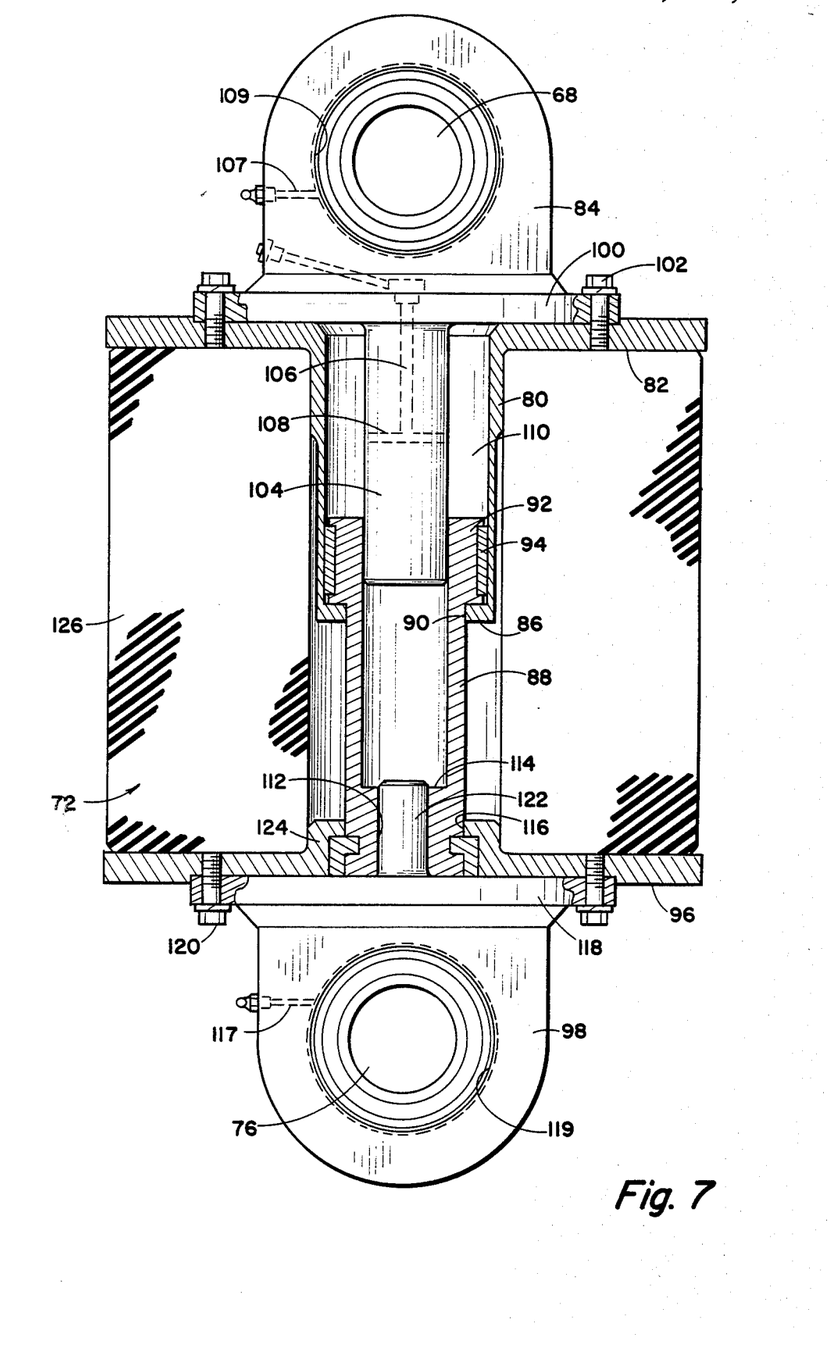
FIG. 7 is a sectional elevational view of a rear suspension assembly utilized in an off-highway vehicle embodying the invention.

The rear suspension assemblies 72 and 74 are substantially identical and only one of the assemblies will be set forth in detail herein. As shown in FIG. 7, the suspension assembly 72 comprises an upper sleeve or tube means 80 having an outwardly extending circumferential flange 82 provided at one end thereof for receiving an apertured upstanding boss member 84 thereon. The apertured boss member receives the pivot means 68 therethrough for pivotally securing the associated drag link means to the suspension assembly. The lower or opposite end of the sleeve 80 is provided with an inwardly directed annular shoulder 86. A second sleeve means 88 extends slidably through the central bore 90 of the shoulder 86, and is provided with an enlarged diameter head portion 92 disposed within the sleeve 80 and engagable with the shoulder 86 for limiting the relative longitudinal movement between the sleeves 80 and 88 in one direction. It is desirable to provide suitable bushing means 94 between the head means 92 and the inner periphery of the sleeve 80 for facilitating the reciprocal movement between the sleeve 80 and the head means 92. An outwardly extending annular flange 96 is suitably secured to the lower or outer end of the sleeve 88 and an apertured boss member 98, generally similar to the boss 84, is suitably secured to the outer surface of the flange 96 for receiving the pivot means 76 therethrough for pivotally securing the assembly 94 to the axle box 24.

The boss 84 is secured to or integral with a plate means 100 which may be bolted or otherwise secured to the flange 82 in any suitable manner, such as by a plurality of spaced bolts 102. A centrally disposed axially outwardly extending shaft or shank 104 is secured to or integral with the plate means 100 and is concentrically arranged within the sleeve 80 and is adapted for receiving the sleeve 88 over the outer end thereof, as is particularly shown in FIG. 7. Suitable internal angled passageway means 106 provides communication between the exterior of the shank 104 and the interior thereof for directing a suitable lubricant to a transversely extending passageway 108 which is open to the annulus 110 between the shank 104 and sleeve 80. In this manner adequate lubrication may be provided for facilitating the relative reciprocal movement between the sleeve 80 and head means 92 and reducing wear therebetween. Similarly, passageway means 107 is provided in the boss 84 to provide communication between the exterior thereof and the bore 109 whereby a suitable lubricant may be injected into the bore 109 for facilitating the pivotal action and reducing wear.

The sleeve 88 is provided with an internal reduced diameter bore portion 112 providing an inwardly directed annular shoulder 114 on the inner periphery of the sleeve 88 in spaced relation with respect to the head means 92. In addition, the sleeve 88 extends through a central bore 116 of the flange 96 and may be secured to the flange in any well known or suitable manner. The boss means 98 is secured to or integral with a plate means 118 which may be secured to the outer surface of the flange 96 in any well known manner such as by a plurality of spaced bolts 120. A suitable paysageway 117 is provided in the boss 98 for directing a lubricant to the bore 119 as is well known. A centrally disposed axially outwardly extending stub shaft 122 is secured to or integral with the plate means 120 and extending into the reduced diameter bore portion 112 for assuring a proper axial orientation between the sleeves 88 and 80 during operation or use of the suspension assembly 92.

The flange means 96 is provided with a centrally disposed hub means 124 surrounding the bore 116 and is of an outer diameter substantially equal to the outer diameter of the sleeve 80 as is evident in FIG. 7. A suitable yieldable sleeve means 126 is disposed around the outer periphery of the sleeve 80 and hub means 124 and interposed between the flanges 82 and 96 for yieldable supporting the flanges in spaced relationship. The yieldable means 126 may be of any suitable or well known type, such as a single unitary rubber or neoprene sleeve or cylinder, a plurality of stacked flexible or yieldable sleeves, or the like, as desired.

As the vehicle 10 moves over the surface of the ground 128 the rear wheels 22 and 23 follow the contours of the earth and as a result move vertically upwardly and downwardly. The flanges 96 of the rear suspension assemblies 92 and 94 move upwardly and downwardly simultaneously with the movement of the rear wheels due to the connection between the boss means 98 and the pivot members 76 and 78. As the flange 96 moves upwardly, the sleeve 88 moves upwardly, moving the head means 92 in a direction toward the flange 82. The movement of the head means 92 is guided by the shank 104. Of course, the upward movement of the sleeve 88 is limited by the engagement of the shank 104 with the stub shaft 122 and/or the shoulder 114. This upward movement of the sleeve 88 is retarded or dampened by the yieldable sleeve means 126 interposed between the flanges 82 and 96, of course. When the wheels 22 and 23 move downwardly, the sleeve 88 moves downwardly simultaneously therewith, and the head means 92 moves downwardly within the sleeve 80. The engagement of the head means 92 with the inwardly directed shoulder 86 limits the downward movement of the head means 92 with respect to the sleeve 80 and precludes any accidental or inadvertent complete separation of the sleeve 88 from the sleeve 80. It will be readily apparent that the rear suspension assemblies 72 and 74 thus substantially isolate the vertical movement of the rear wheels 22 and 23 from the dump body 14.

As hereinbefore set forth, it may be preferable to construct the floor plate 38 in such a manner that both the inner and outer surfaces thereof are smooth. However, in some instances, such as when the ambient conditions under which the vehicle 10 is to operate include extremely low temperatures, it may be desirable to provide longitudinally extending channels 128 and 130 (FIG. 4) on the outer surface of the plate 38 and transversely extending channels 132 in communication with the channels 128 and 130. These channels may be suitably connected with a source of heat, such as the exhaust system of the vehicle, whereby heat may be circulated within the interior of the plate 38 for directing warmth to the material contained within the dump body 14. This may reduce or substantially eliminate freezing of the materials being handled by the vehicle 10, as is well known.

Figure 3:
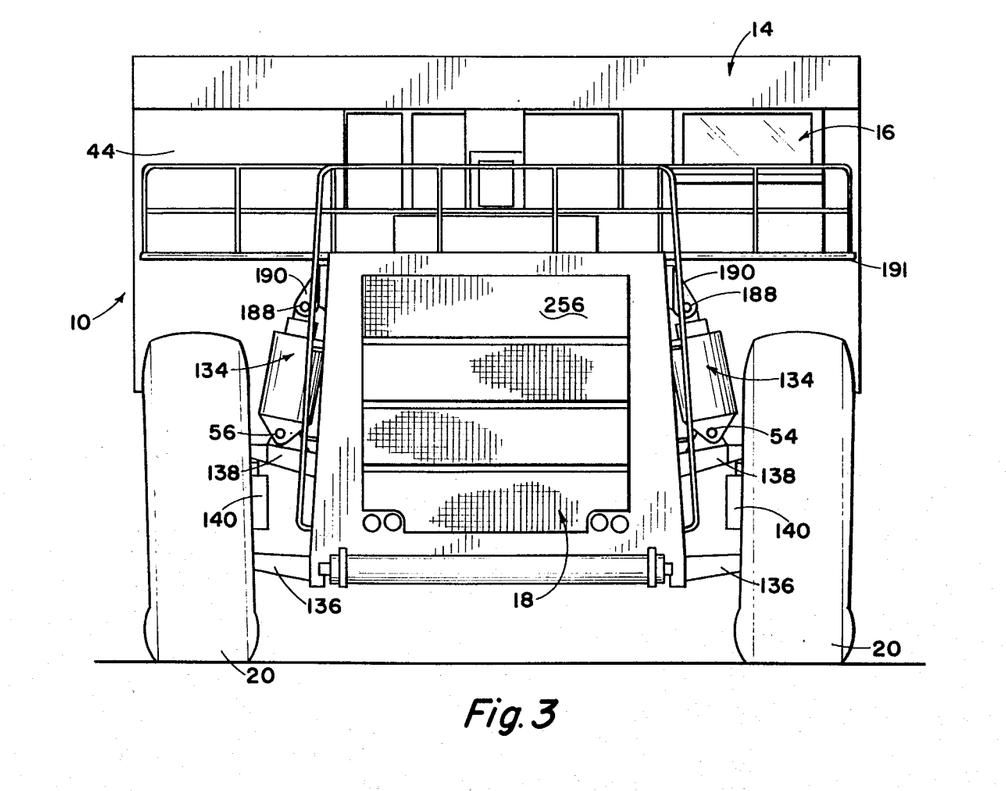
FIG. 3 is a front elevational view of the vehicle as shown in FIG. 2.
Figure 5:
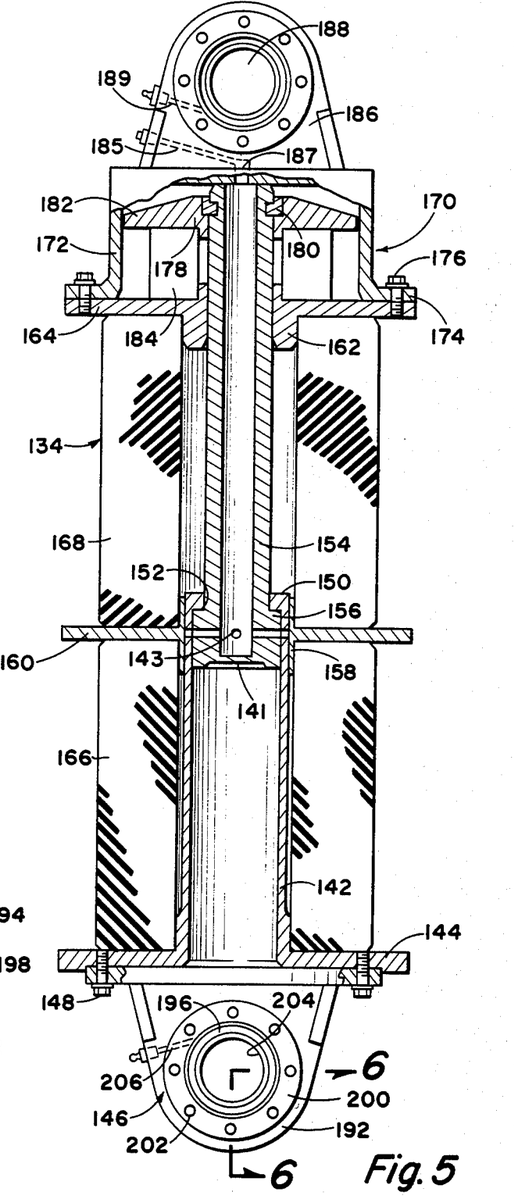
FIG. 5 is a sectional elevational view of a front suspension assembly utilized in an off-highway vehicle embodying the invention.
Figure 6:
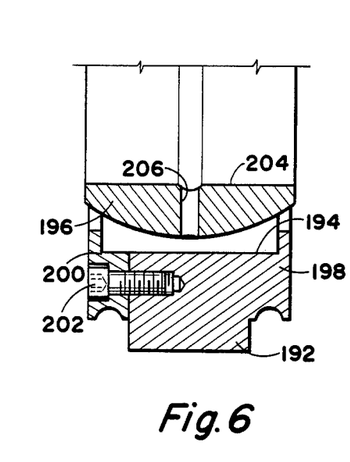
FIG. 6 is a view taken on line 6—6 of FIG. 5.

Referring now to FIGS. 5 and 6, a suitable front suspension assembly 134 is secured at each side of the main frame section 12 and interposed between the frame 12 and the respective front wheel 20 for absorbing vertical movement of the front wheels with respect to the cab section 16 and frame 12. As hereinbefore set forth each front wheel 20 is independently mounted on the frame section 12, and this may be accomplished in any well known manner, such as by suitable pivotal suspension mounting arms 136 and 138 (FIG. 3). The mounting arms 136 and 138 are normally bolted or otherwise secured to the axle 140 of the respective wheel 20 and support the wheel in such a manner that the wheel is freely movable in a vertical direction with respect to the main frame section 12. At least one arm, such as the arm 138 of each wheel support means is secured to the frame section 12 by means of an independent front suspension assembly 134. It is to be noted that the connection between the suspension assemblies 134 and the respective support arm 138 is shown somewhat schematically in FIG. 3.

The front suspension assembly 134 comprises a first central sleeve member 142 having an outwardly extending circumferential flange 144 provided at one end thereof. A suitable boss means 146 is bolted or otherwise secured to the outer surface of the flange 144 in any suitable manner, such as by a plurality of spaced bolts 148 for pivotally securing the suspension assembly 134 to the respective arm 138 in a manner as will be hereinafter set forth. The opposite end of the sleeve member 142 is provided with an inwardly directed annular shoulder 150 having a central bore 152 therein for slidably receiving a second sleeve 154 therethrough. The sleeve 154 is provided with an enlarged diameter head portion 156 at one end thereof, the head portion 156 being slidably disposed within the sleeve 142. The end of the sleeve 154 at the head portion 156 is closed by a wall 141, and a plurality of radially extending bores or passageways 143 are provided in the sidewall of the head member 156 to provide communication between the interior of the sleeve 154 and the interior of the sleeve 142 for a purpose as will be hereinafter set forth.

In addition, a hub or sleeve member 158 is disposed around the outer periphery of the sleeve 142 in the proximity of the shoulder 150 and is provided with an outwardly extending circumferential flange 160 which is preferably of an outer diameter substantially equal to the outer diameter of the flange 144, but not limited thereto. The hub 158 may be secured to the sleeve 142 in any suitable manner (not shown) whereby the flange 160 is disposed in longitudinally spaced relation with respect to the flange 144. A second hub means 162 is disposed around the outer periphery of the second sleeve 154 and may be secured thereto in any suitable manner (not shown) in spaced relation with respect to the hub means 158. The outer diameter of the hub 162 is preferably substantially equal to the outer diameter of the hub 158, and an outwardly extending circumferential flange 164 is provided on the outer periphery of the hub 162 in spaced relation with respect to the flange 160. The outer diameter of the flange 164 is preferably substantially equal to the outer diameter of the flanges 160 and 144. First yieldable sleeve means 166 is disposed around the outer periphery of the sleeve 142 and interposed between the flanges 144 and 160 for yieldably supporting the flange 160 from the flange 144. Second yieldable sleeve means 168 is disposed around the outer periphery of the sleeve 154, concentrically supported by the hub members 158 and 162, and interposed between the flanges 160 and 164 for yieldably supporting the flange 164 above the flange 160. The yieldable sleeve means 166 and 168 may be of the same type as hereinbefore set forth in connection with the yieldable sleeve means 126.

It will be readily apparent that any vertical upward movement of the wheels 20 will be transmitted to the sleeve 142 by virtue of the connection between the suspension assembly 134 and the support arm 138. As the sleeve 142 moves upwardly, the shoulder 150 will move in a direction toward the hub 162, and the upward movement of the sleeve 142 will be limited by the engagement between the shoulder 150 and hub 162. Of course, the yieldable sleeve means 166 and 168 will dampen or cushion any relative movement between the sleeve 142 and the sleeve 154. Upon any downward movement of the wheel 20, the sleeve 142 will try to move downwardly or away from the hub 162, and the downward movement of the sleeve 142 will be limited by the engagement of the shoulder 150 with the head member 156.

A rebound suspension means 170 is provided for cushioning or dampening the downward movement of the wheels. The device 170 comprises a housing or sleeve 172 having an outwardly extending flange 174 at one end thereof bolted or otherwise secured to the outer surface of the flange 164 such as by means of a plurality of spaced bolts 176. The upper or outer end of the sleeve 154 extends longitudinally through the sleeve 172 and is held concentrical with respect thereto by the hub member 162. An additional hub means 178 is secured in the proximity of the upper outer end of the sleeve 154 in any suitable manner, such as by a locking ring 180, and an outwardly extending circumferential shoulder or flange 182 is provided around the outer periphery of the hub means 178 in spaced relation with respect to the flange 164. The outer diameter of the flange 182 is of a diameter slightly less than the inner diameter of the sleeve 172 whereby the flange 182 is slidable with respect thereto. A yieldable sleeve means 184 is disposed around the outer periphery of the sleeve 154 and interposed between the flanges 164 and 182.

When the wheel 20 moves downwardly beyond the limit of downward movement of the sleeve 142 as established by the engagement of the shoulder 150 with the head 156, the sleeve 154 is pulled or moved downwardly with the sleeve 142. The downward movement of the sleeve 154 pulls the flange 182 downwardly in a direction toward the flange 164, and this movement is dampened or cushioned by the yieldable sleeve means 184. It will thus be apparent that the upward movement of the front wheels 20 is dampened or cushioned by the yieldable sleeves 166 and 168 whereas the downward movement of the wheels 20 is dampened or cushioned by the yieldable sleeve means 184.

The rebound suspension means 170 may be secured to the main frame section 12 in any suitable or well known manner, and as shown herein an upstanding apertured boss means 186 is secured to the upper end of the sleeve or housing 172 in any suitable manner, and the boss means 186 is pivotally secured at 188 to a depending structural element 190 (FIG. 3) welded or otherwise secured to the outer periphery of the frame means or to the under surface of a floor plate 191 of the cab section 16, as desired. Of course, it is desirable to provide a suitable lubrication passageway 185 in the boss means 186 which is in communication with a central port 187 provided in the upper end of the housing 172 whereby a lubricant may be admitted into the interior of the sleeve 154 and discharged through the radial passageways 143 of the head 156 to provide lubrication between the head means 156 and inner periphery of the sleeve 142 during relative longitudinal movement therebetween. In addition, a lubrication passageway 189 may be provided in the boss 186 in communication with the pivot 188 for proper lubrication thereof, as is well known. Furthermore, it is to be noted that the load is carried by the pins or trunnions 188 and 54-56 and the vertical movement is controlled by the construction of the assemblies 134-170.

With respect to the connection of the boss means 146 with the respective suspension arm 138, as shown herein, the boss means 146 comprises a plate member 192 having an aperture 194 extending therethrough for receiving a suitable pivot ball means 196 therein, as is well known. The ball means 196 is retained in position in the bore 194 by an inwardly directed annular shoulder 198 provided at one end of the bore 198 and an annular locking plate means 200 which may be secured to the opposite end of the bore in any well known manner, such as by a plurality of screws or bolts 202. The ball means 196 is provided with a central bore 204 extending therethrough for receiving a pivot shaft therethrough, such as the pivot shaft 54 or 56 shown in FIG. 3. Of course, it is preferable to provide suitable lubricating passageway means 206 for the ball 196 and shaft 56 or 54.

Figure 8:
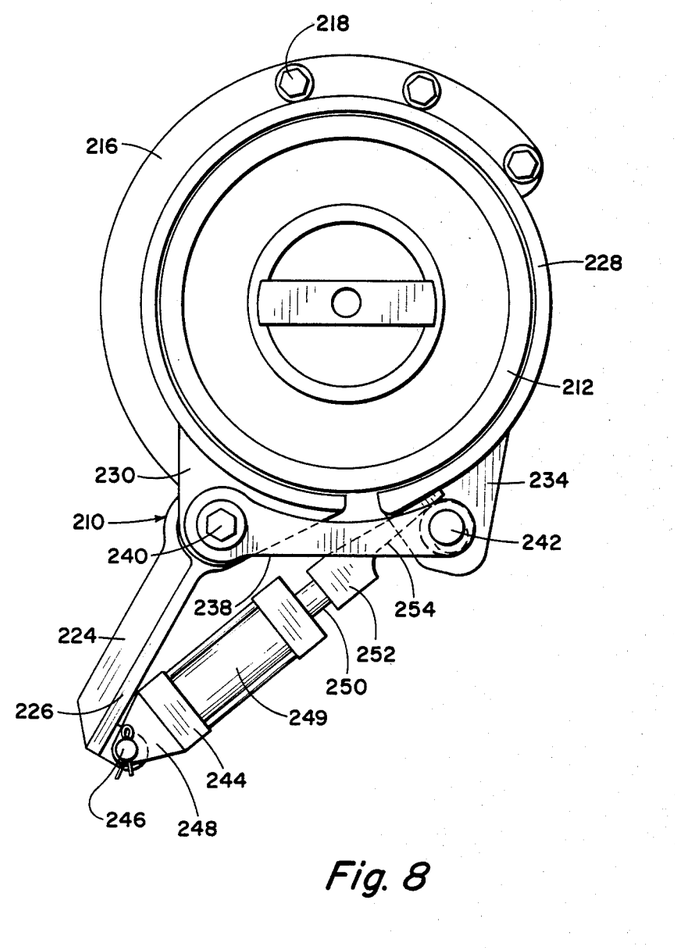
FIG. 8 is a front elevational view of a parking brake utilized in an off-highway vehicle embodying the invention.
Figure 9:
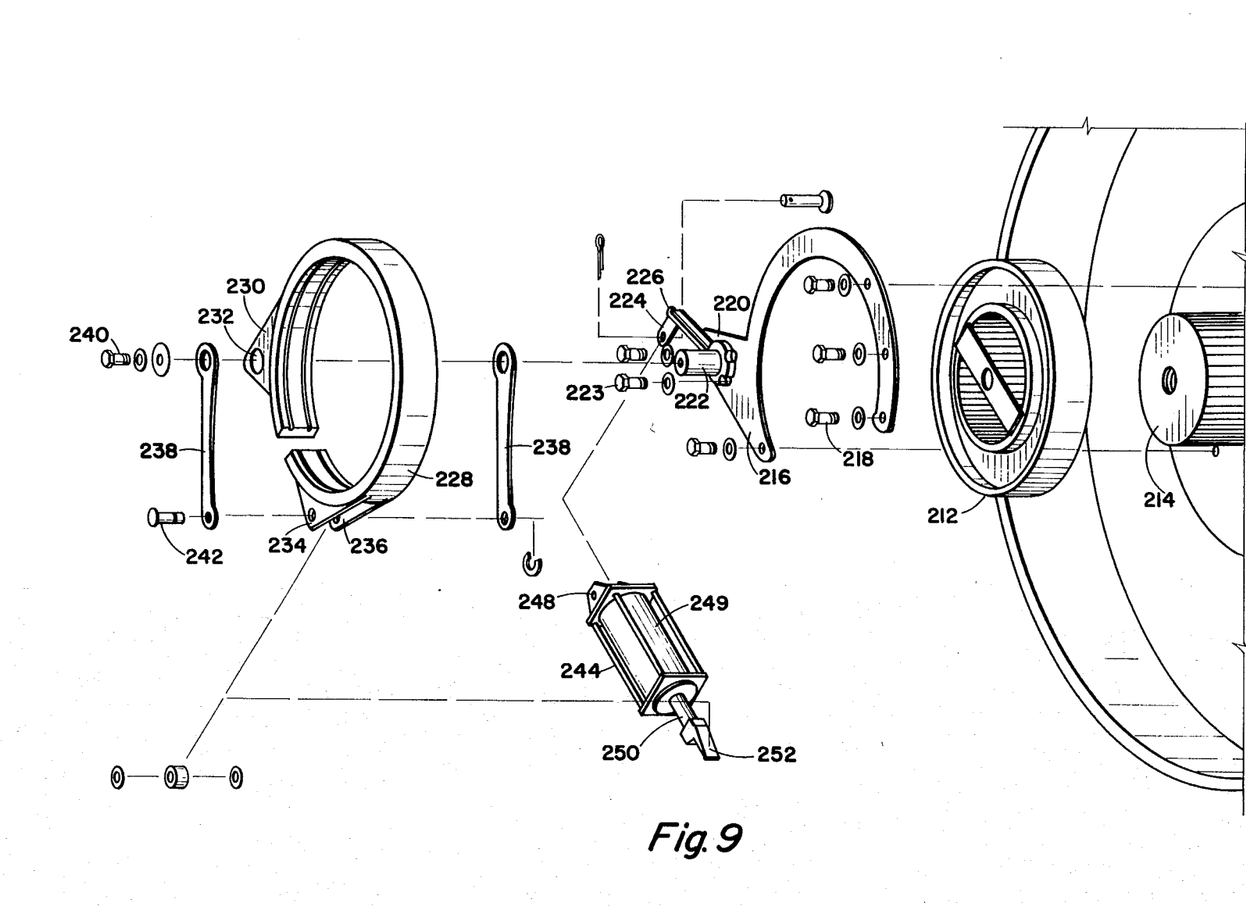
FIG. 9 is an exploded perspective view of the parking brake shown in FIG. 8.

As hereinbefore set forth, it is advantageous to provide a hand brake for the vehicle 10 in addition to the usual disc brakes normally provided in vehicles of this type. Referring to FIGS. 8 and 9, a hand brake assembly 210 is shown which comprises a brake shoe 212 secured around the usual drive shaft 214 of the electric motor (not shown) normally provided for powering or driving of the vehicle wheels, such as the rear wheels 22 and 23. A yoke member 216 is secured to the motor in any suitable manner, such as by a plurality of bolts 218 and extends around a portion of the outer periphery of the brake drum 212 at the rear portion thereof. A radially outwardly extending projection arm 220 is provided on the yoke 216 for supporting an axially outwardly extending mounting post 222 which may be secured thereto by a plurality of bolts 223. A substantially L-shaped support member 224 is secured to the arm 220 and is provided with a stop means 226.

A split brake band 228 is loosely disposed around the outer periphery of the brake drum 212 for selective engagement therewith for precluding rotation of the shaft 214 as will be hereinafter set forth. An outwardly depending flange 230 is provided on the outer periphery of the brake band 228 and is provided with an aperture 232 for receiving the post 222 therethrough whereby the brake band 228 may be anchored to the yoke means 216. The flange 230 is disposed in the proximity of one end of the brake band, and a pair of generally similar outwardly extending flanges 234 and 236 are provided at the opposite end of the brake band. A link member 238 is interposed between the flange 230 and the flanges 234 and 236, and the opposite ends of the link 238 are pivotally secured to the flanges 230 and 234-236 in any suitable manner, such as by pivot pins 240 and 242, respectively.

An open-type housing 244 is secured to the L-shaped support member in any well known manner, such as by bolts (not shown) cooperating with flanges 248 provided on the housing 244. A hydraulic (or pneumatic, if desired) cylinder 249 is mounted within the housing 244 in any suitable manner (not shown) and is operably connected with the hydraulic system of the vehicle 10 whereby reciprocal actuation of the cylinder piston rod 250 is achieved by the application of fluid pressure on the opposite ends of the piston, as is well known. A wedge means 252 is secured to the outer end of the piston rod 250 and is slidably disposed between the outer periphery of the brake band 228 and the pivot pin 242, as is particularly shown in FIG. 8.

The brake band 228 is loosely disposed around the outer periphery of the brake drum 212 when the hand brake 210 is in an off or disengaged position. In the disengaged position of the brake band 223, the piston rod 250 is maintained in a retracted position within the cylinder housing 244 by the application of fluid pressure on the outboard end of the piston, as is well known. The contracted position of the rod 250 maintains the wedge means 252 in a left hand position, as viewed in FIG. 8, thus holding the wedging action away from the brake band and precluding accidental engagement of the brake band 228 with the brake drum 212. When it is desired to engage the hand brake 210, the fluid pressure is relieved from the outboard end of the piston and transferred to the inboard end thereof, whereupon the rod 250 is extended for moving the wedge means 252 into an extended position between the pivot shaft 242 and the outer periphery of the brake band 228. In essence, this causes the pivot shaft 242 to "ride up" on the tapered outer surface 254 of the wedge means 250 since the stop means 226 prevents the housing 244 and cylinder 249 carried thereby to pivot away from the brake drum. As the pivot pin 242 rides along the tapered surface 254, the brake band 228 is pulled tightly around the outer periphery of the brake drum for frictional engagement therewith, whereupon the rotation of the brake drum 212 is ceased, and the connection of the brake drum 212 with the drive shaft 214 causes the drive shaft to cease rotating. The wheels 22 and 23 are driven by the rotation of the drive shaft 214, and the cessation of rotation of the drive shaft 212 provides a braking action for the wheels 22 and 23.

As hereinbefore set forth, the application of the fluid to the outboard side of the piston of the cylinder 244 assures that the brake band will be maintained in a disengaged position with respect to the brake drum, thus precluding an inadvertent application of the hand brake 210. In addition, it is preferable that the cylinder be operably connected with the fluid system whereby the fluid will be directed to the inboard side of the piston at all times when the drive system of the vehicle is in a "Park" position, thus assuring that the wedge means 250 will be in the extended and wedging position between the brake band 228 and pivot pin 242 at all times when the vehicle is in a parking mode. This assures that the hand brake 210 will be engaged in the parking mode of the vehicle for greatly reducing accidental movement of the vehicle, whether or not the operator is in attendance.

The radiator section 18 is particularly unique in that not only does the section 18 include a radiator 256 of a larger area for cooling than the usual radiator in vehicles of this type, but also, the large area of the radiator 256 permits the utilization of a larger fan 258 (FIG. 10) for movement of air across the radiator. For example, the area of the radiator 256 is approximately sixty square feet, and the fan 258 is approximately seven feet in diameter. This provides for a more efficient cooling of the vehicle engine (not shown) since the large diameter fan may be operated at a lower rpm than normally possible in this type equipment.

In addition, the manner in which the radiator 256 is mounted on the vehicle 10 is unique and eliminates the need for the conventional belt tensioning sheave and mount therefor. The radiator 256 is disposed forward of the vehicle engine (not shown), as is well known, and includes a pair of spaced substantially identical oppositely disposed side channels 260 (only one of which is shown) bolted or otherwise secured to the upright side edges of the radiator 256. An open housing 262 is welded or otherwise secured to the channel 260 in the proximity of the lower end thereof as viewed in FIG. 10 and extends outwardly therefrom in a plane parallel to the plane of the radiator. The housing 262 includes a pair of spaced substantially horizontally disposed apertured plates 264 and 266 which receive a threaded shank 266 therethrough. A stop member 267 is provided at the upper end of the shank 266, and the lower end is supported in a suitable journal 268. The journal is mounted at the forward end of a support channel 270 which is one of the structural elements of the normal engine skid for the vehicle 10. A substantially identical support channel is provided for the opposite side of the radiator 256, and the support channels 270 are preferably disposed on opposite sides of the vehicle engine (not shown). The support 270 and channels 260 secure the radiator 256 to the forward portion of the vehicle 10. The usual housing 272 of the fan 258 is carried by the radiator 256 in the normal manner and the fan is mounted rearwardly of the radiator 256 and forwardly of the vehicle engine (not shown). A first sheave 274 is operably connected with the fan by a drive shaft 276, and a second sheave 278 is operably connected with the crankshaft or drive shaft 280 of the vehicle engine (not shown) for rotation thereby. A suitable belt 282 extends around and between the sheaves 274 and 278 for transmitting rotation from the sheave 278 to the sheave 278 for rotation of the fan 258 when the vehicle engine is in operation.

Figure 10:
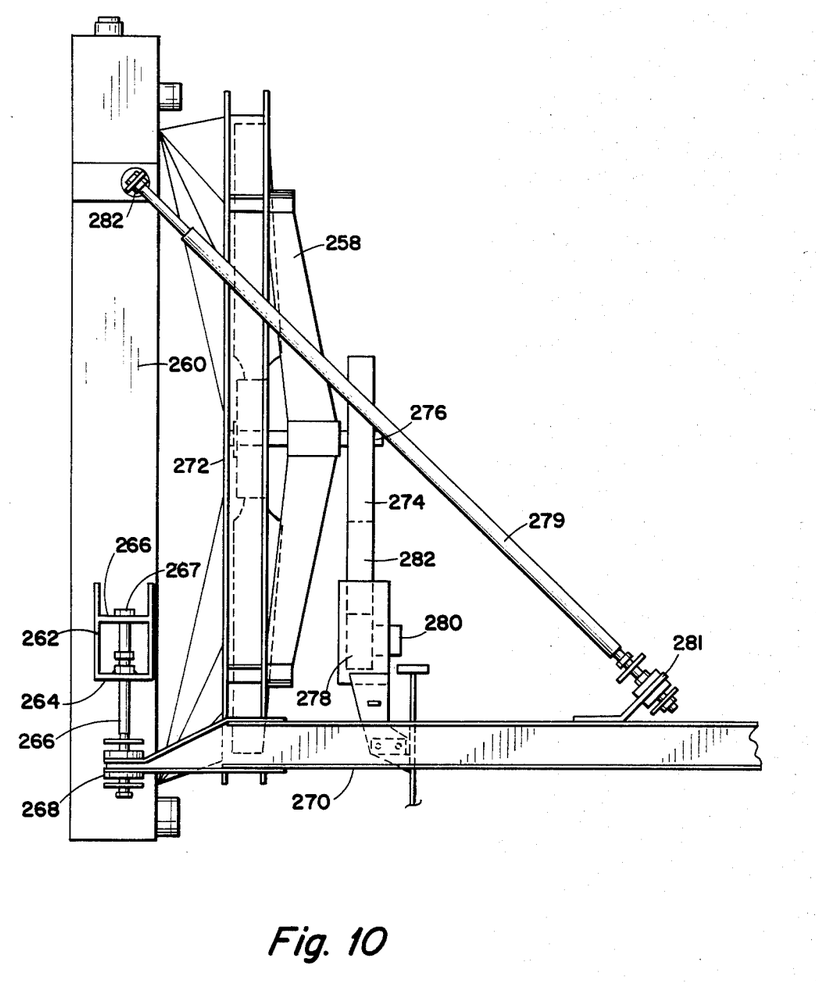
FIG. 10 is a side elevational view of a radiator attachment means utilized in an off-highway vehicle embodying the invention.

A pair of substantially identical telescopic stabilizer rods 279 (only one of which is shown) are secured between the channel 270 and respective channel 260. One end of the stabilizer rod 279 is pivotally secured to the channel 270 in any well known manner as indicated generally at 281, and the opposite end of the stabilizer 278 is pivotally secured to the respective channel 260 in any well known manner as generally indicated at 282.

The vertical position of the radiator 256 and associated fan 258 may be varied as desired in order to adjust the tension of the belt 282 with respect to the sheaves 274 and 278. The threaded shanks 266 may be rotated in one direction for moving the respective plates 262 and 264 upwardly whereby the channels 260 are moved upwardly simultaneously therewith. This elevates the radiator 256 and the fan 258 and associated sheave 274. When the threaded shanks 266 are rotated in an opposite direction, the channels 260 will be moved downwardly for lowering the position of the radiator 256, fan 258 and sheave 274. In this manner the distance between the sheaves 274 and 278 may be varied as required for adjusting the tension of the belt 282 extending around and between the sheaves. Of course, the stabilizers facilitate the vertical movement of the radiator 256 during the adjusting of the belt tension.

From the foregoing, it will be apparent that the present invention provides a novel large off-highway two axle vehicle including a main frame section, a tilting rear dump body section, a cab section and a radiator section and wherein the frame section is secured to the rear axle box by means of cooperating A-frame members and drag links whereby the overall length of the frame may be considerably shorter than is presently possible, thus permitting a strong construction for the frame without increasing the overall weight thereof. Unique rear and front suspension assemblies are provided for the vehicle for substantially isolating the frame and dump body from shock during operation of the vehicle over rough terrain, or the like. In addition, the radiator is secured to the engine skid frame in such a manner that the vertical orientation of the radiator may be varied in order to adjust the belt tension of the drive system for the fan, thus eliminating the usual tensioning sheave arrangement. An auxiliary hand brake system is also provided for the vehicle which is an added safety feature for the vehicle and operator.

Whereas the present invention has been described in particular relation to the drawings attached hereto, it should be understood that other and further modifications, apart from those shown or suggested herein may be made within the spirit and scope of this invention.

What is claimed is:

1. A large off-highway two axle rear dump vehicle comprising a main frame section, a tilting dump body section, a cab section, a radiator section, front wheels independently secured to the main frame section to provide for steering of the vehicle, rear wheels secured to the opposite ends of a common axle to provide driving power for the vehicle, means conecting the main frame section to the axle whereby the rearmost end of the main frame section terminates short of the outer limit of the axle, means supporting the radiator section whereby the vertical orientation of the radiator section may be adjusted, front suspension means operably connected with the front wheels for substantially isolating vertical movement of the front wheels from the main frame section, and rear suspension means operably connected between the axle and the main frame section for substantially isolating the vertical movement of the rear wheels from the main frame section.

2. A large off-highway two axle rear dump vehicle as set forth in claim 1 wherein the main frame section comprises a pair of spaced deep box sections, cross members secured between the box sections for strengthening the main frame section and providing an open central area therefor, and an A-frame support provided at the forward end of each box section for facilitating support of the cab section and front wheels.

3. A large off-highway two axle rear dump vehicle as set forth in claim 1 wherein the main frame section comprises a pair of spaced deep box sections, and a plurality of longitudinally spaced tubular cross members secured between the box sections for providing strength for the main frame section.

4. A large off-highway two axle rear dump vehicle as set forth in claim 3 wherein the upper edge of each box section is substantially straight for strength to reduce breakage of the main frame section.

5. A large off-highway two axle rear dump vehicle as set forth in claim 1 wherein the radiator section comprises a radiator, a fan secured to the radiator for movement of air therethrough, skid frame means secured to the vehicle, adjustable cam means interposed between the skid frame means and radiator to provide for the vertical orientation of the radiator section.

6. A large off-highway two axle rear dump vehicle as set forth in claim 5 wherein the adjustable cam means comprises apertured plate means secured to the opposite sides of the radiator and extending outwardly therefrom, threaded shank means extending through the aperture plate means, journal means secured to the skid frame means for receiving one end of the threaded shank means therein, stop means provided at the opposite end of the threaded shank means, said threaded shank means being rotatable in one direction for moving the apertured plate means vertically upwardly for simultaneous vertical upward movement of the radiator and rotatable in an opposite direction for moving the apertured plate means vertically downwardly for simultaneous vertical downward movement of the radiator.

7. A large off-highway two axle rear dump vehicle as set forth in claim 1 wherein the means connecting the main frame section to the axle comprises upper A-frame means secured to the dump body, and drag link means pivotally secured between the A-frame means and the main frame means and the axle.

8. A large off-highway two axle rear dump vehicle as set forth in claim 7 wherein the drag link means is secured to the upper end of the rear suspension means, and the lower end of the rear suspension means is secured to the axle.

9. A large off-highway two axle rear dump vehicle as set forth in claim 1 wherein the front suspension means comprises axially aligned relatively reciprocal central sleeve means, longitudinally spaced circumferential flange means extending outwardly from said sleeve means, yieldable sleeve means disposed around the outer periphery of the sleeve means and interposed between the flange means for cushioning the reciprocal movement between the sleeve means in one direction, and yieldable rebound means disposed around the outer periphery of the sleeve means outboard of the flange means for cushioning the reciprocal movement between the sleeve means in an opposite direction.

10. A large two axle rear dump off-highway vehicle as set forth in claim 1 wherein the rear suspension means comprises first and second central sleeve means disposed in mutually reciprocal relation, first outwardly extending circumferential flange means provided at the outer end of one of the sleeve means, second outwardly extending circumferential flange means provided at the outer end of the second sleeve means and disposed in spaced relation with respect to the first flange means, yieldable sleeve means disposed around the outer periphery of the first and second sleeve means and interposed between the flanges for cushioning any relative movement between the flanges along the length of the sleeve means, central guide means extending into at least one of said sleeve means for guiding the reciprocal movement between the first and second sleeve means, and stop means cooperating between the first and second sleeve means for limiting the movement therebetween in one direction to preclude an accidental disengagement between the first and second sleeve means.

11. A large two axle rear dump off-highway vehicle as set forth in claim 1 and including independent hand brake means cooperating with at least one wheel for additional braking power and comprising brake drum means operably connected with the said one wheel for rotation simultaneously therewith, yoke means secured to a stationary support structure, brake band means secured to the yoke means and disposed around the outer periphery of the brake drum, wedge means carried by the yoke means and operable between extended and contracted positions, said wedge means being engagable with the brake band means in the extended position for tightening the brake band means around the outer periphery of the brake drum for precluding rotation thereof.

12. A large two axle rear dump off-highway vehicle as set forth in claim 11 wherein the brake band comprises an open ended band having outwardly projection flange means provided at each end thereof, link means pivotally secured between the flange means and responsive to the wedge means in the extended position for tightening of the brake band around the outer periphery of the brake drum.

13. A large two axle rear dump off-highway vehicle as set forth in claim 11 wherein the wedge means comprises fluid piston rod and cylinder means secured to the yoke means and operably connected with a fluid system of the vehicle whereby the piston rod may be selectively reciprocated within the cylinder means to provide alternate extended and contracted positions, and a wedge element secured to the outer end of the piston rod for engagement with the brake band in the extended position of the piston rod.

* * * * *